(12) United States Patent
Jain et al.

(10) Patent No.: US 8,054,830 B2
(45) Date of Patent: Nov. 8, 2011

(54) MANAGING THE DISTRIBUTION OF CONTROL PROTOCOL INFORMATION IN A NETWORK NODE

(75) Inventors: Vipin Jain, San Jose, CA (US); Mark Llacuna, San Jose, CA (US)

(73) Assignee: Alcatel Lucent, Paris (FR)

( * ) Notice: Subject to any disclaimer, the term of this patent is extended or adjusted under 35 U.S.C. 154(b) by 456 days.

(21) Appl. No.: 11/544,825

(22) Filed: Oct. 6, 2006

(65) Prior Publication Data
US 2007/0127464 A1   Jun. 7, 2007

Related U.S. Application Data

(60) Provisional application No. 60/748,188, filed on Dec. 7, 2005.

(51) Int. Cl.
*H04L 12/28* (2006.01)
(52) U.S. Cl. .......................... 370/389; 370/401; 370/352
(58) Field of Classification Search .................. 370/389, 370/352, 395
See application file for complete search history.

(56) References Cited

U.S. PATENT DOCUMENTS

| | | | |
|---|---|---|---|
| 6,424,659 B2 * | 7/2002 | Viswanadham et al. | 370/469 |
| 6,590,897 B1 * | 7/2003 | Lauffenburger et al. | 370/395.6 |
| 7,027,418 B2 * | 4/2006 | Gan et al. | 370/329 |
| 2002/0065932 A1 * | 5/2002 | Kobayashi | 709/233 |
| 2003/0221015 A1 | 11/2003 | Basso et al. | |
| 2005/0018668 A1 * | 1/2005 | Cheriton | 370/389 |
| 2005/0060419 A1 * | 3/2005 | Fujii et al. | 709/230 |
| 2005/0122962 A1 * | 6/2005 | Delaney et al. | 370/352 |

FOREIGN PATENT DOCUMENTS

WO   2005067532 A2   7/2005

OTHER PUBLICATIONS

PCT International Search Report PCT/US2006/046903, Jan. 26, 2011.

* cited by examiner

*Primary Examiner* — Dang Ton
*Assistant Examiner* — Pamit Kaur

(57) ABSTRACT

A technique for managing control protocol information in a network node involves identifying messages as control protocol messages and checking the messages to see if the messages carry any updated control protocol information. If a control protocol message carries updated control protocol information, then the message is forwarded to a control protocol processor and if the message does not carry any updated control protocol information then the message is dropped before getting to the control protocol processor. The determination as to whether or not a control protocol message carries updated control protocol information can be made by generating a digest from a control protocol message and comparing the digest to a digest generated from a previously received control protocol message. A mismatch between the newly generated digest and the digest from the previously received control protocol message is an indication that the current message carries updated control protocol information.

18 Claims, 8 Drawing Sheets

| Digest Table |||
|---|---|---|
| Protocol Entity Identifier | Protocol | Digest |
| | | |
| | | |
| | | |

MANAGING THE DISTRIBUTION OF CONTROL PROTOCOL INFORMATION IN A NETWORK NODE

CROSS-REFERENCE TO RELATED APPLICATION

This application is entitled to the benefit of provisional Patent Application Ser. No. 60/748,188, filed 7 Dec. 2005.

FIELD OF THE INVENTION

The invention relates generally to network management, and more particularly, to managing the distribution of control protocol information in a network node.

BACKGROUND OF THE INVENTION

Control protocols in frame-based network perform control functions such as topology management, link aggregation, connectivity fault management, bidirectional flow detection, etc. Many network control protocols call for the transmission of control protocol messages to communicate control protocol information to other nodes in the network. Some control protocols require the transmission of control protocol messages at a specified fixed interval. Often times control protocol messages are required to be transmitted at the specified fixed interval whether or not there is any updated control protocol information to be communicated. For example, after an initial period of protocol convergence, control protocol messages are transmitted at regular intervals from a first peer entity to indicate to a second peer entity that the first peer entity is still alive.

Typically, network nodes are configured to recognize control protocol messages and to automatically provide the control protocol messages to a control protocol processor for protocol processing. The control protocol processor consumes resources processing each control protocol message that is received whether or not the received control protocol message includes updated control protocol information that may affect the protocol state. During steady state operation of a control protocol, many of the received control protocol messages do not carry any information that will change the control protocol state (e.g., the information carried in the control protocol messages only indicates that the peer entity is alive and that connectivity to the peer entity is not broken), yet valuable computing resources are consumed processing these control protocol messages.

In view of this, what is needed is a technique for managing protocol information that reduces the burden of processing control protocol messages that have no affect on the protocol state without negatively affecting the function of the control protocols.

SUMMARY OF THE INVENTION

A technique for managing control protocol information in a network node involves identifying messages as control protocol messages and checking the messages to see if the messages carry any updated control protocol information. If a control protocol message carries updated control protocol information, then the message is forwarded to a control protocol processor and if the message does not carry any updated control protocol information then the message is dropped before getting to the control protocol processor. By dropping control protocol messages that do not carry any updated control protocol information, valuable resources are not wasted processing redundant control protocol information that will have no affect on the protocol state.

To effectively implement the above-described method for managing control protocol information, it is key to be able to quickly and efficiently determine if a control protocol message carries updated control protocol information. In accordance with an embodiment of the invention, the determination as to whether or not a control protocol message carries updated control protocol information is made by generating a digest from a control protocol message and comparing the digest to a digest generated from a previously received control protocol message. A mismatch between the newly generated digest and a digest from a previously received control protocol message is an indication that the current message carries updated control protocol information.

Because the goal is to determine whether or not the control protocol message carries updated control protocol information, the digest can be generated from a subset of the entire control protocol message. In particular, the digest can be generated from a field of the message that is expected to indicate that the control protocol information has been updated relative to a previously received control protocol message.

In accordance with another embodiment of the invention, instead of having a control protocol processor repeatedly generating and sending redundant control protocol messages to a transmit modules, control protocol messages are only sent to transmit modules when there is updated control protocol information to communicate. Control protocol messages received at the transmit modules are cached at the transmit modules and used to generate redundant control protocol messages that are required to be retransmitted at specified intervals. A cached control protocol message is maintained at the transmit module and used to generate control protocol messages until a new control protocol message, which carries updated control protocol information, is provided to the transmit module. By caching a control protocol message at a transmit module and using the cached control protocol message to generate subsequent redundant control protocol messages, processing resources of the control protocol processor are conserved and can be used for other operations.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION

Figure 1:
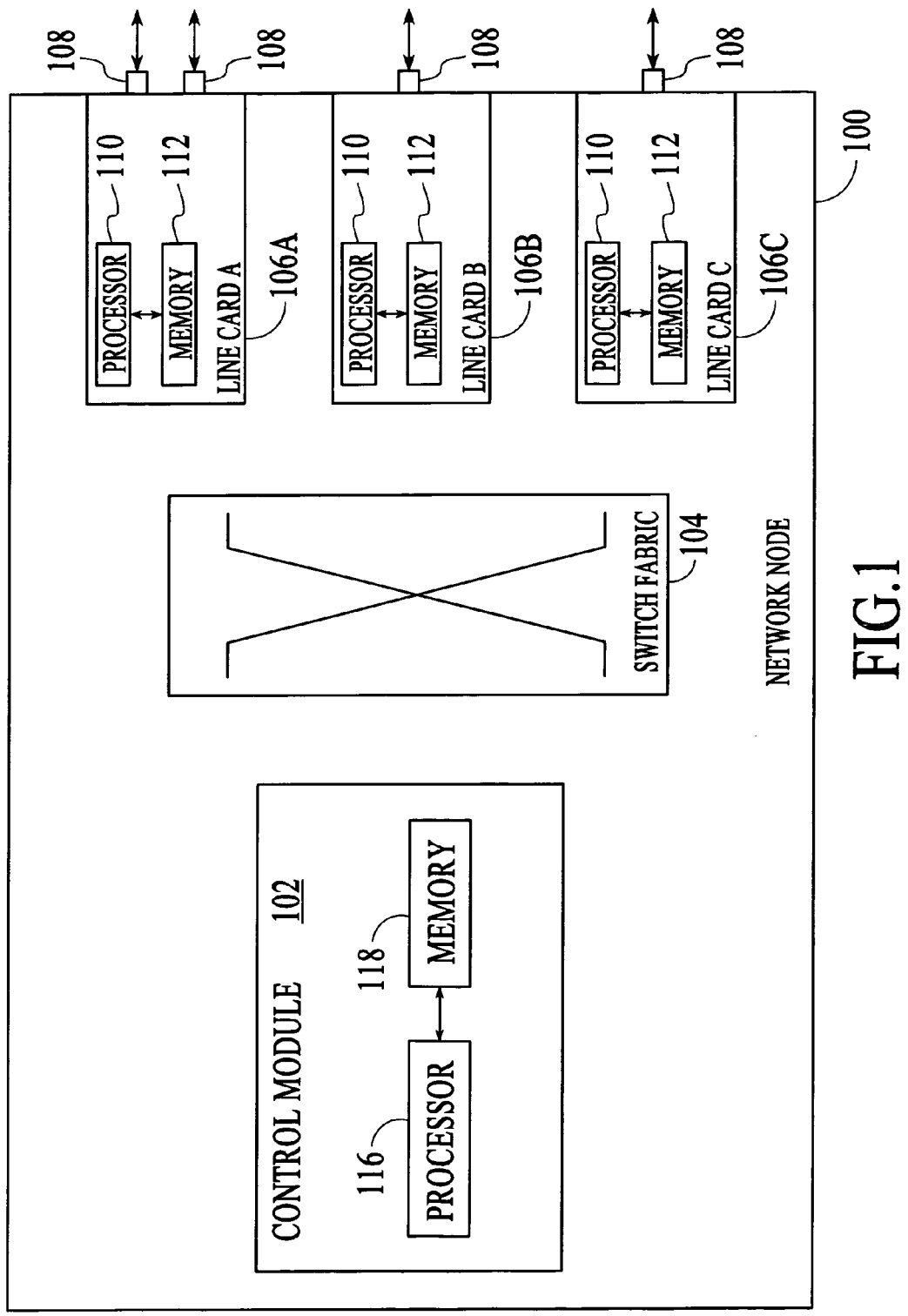
FIG. 1 depicts a network node in which an embodiment of the invention can be implemented.

FIG. 1 depicts a network node 100 in which an embodiment of the invention can be implemented. The exemplary network node includes a control module 102, a switch fabric 104, and three line cards 106A, 106B, and 106C (line cards A, B, and C). The network node handles traffic in discrete units, often referred to as datagrams. In an embodiment, the network node is an Ethernet switch/router that forwards traffic within the network node using Layer 2, Layer 3, and/or Layer 4 header information. The network node may include line cards that support network protocols such as Ethernet, Bridging, Internet Protocol (IP), multiprotocol label switching (MPLS), asynchronous transfer mode (ATM), and Frame Relay. Although an Ethernet-based switch/router is described, the disclosed control protocol management techniques can be applied to other types of network nodes.

Each of the line cards 106A-106C includes at least one port 108, a processor 110, and memory 112, which perform functions such as receiving traffic into the network node, buffering traffic, making forwarding decisions, communicating with the control module, and transmitting traffic from the network node. The processor within each line card may include a multifunction processor and/or an application specific processor that is operationally connected to the memory. The processor performs functions such as packet parsing, packet classification, and making forwarding decisions. The memory within each line card may include circuits for storing operational code, for buffering traffic, for storing logical port information, and for storing other data structures. Operational code is typically stored in non-volatile memory such as electrically erasable programmable read-only memory (EEPROM) or flash ROM while traffic and data structures are typically stored in volatile memory such as random access memory (RAM). Example data structures that are stored in the RAM include traffic forwarding information (i.e., exit port tables). Forwarding information may also be stored in content addressable memory (CAM) or a combination of CAM and RAM. Although the processor and memory are depicted as separate functional units, in some instances, the processor and memory are integrated onto the same device. In addition, there may be more than one discrete processor unit and more than one memory unit on the line cards. In an embodiment, each line card runs its own instance of an operating system although this is not a requirement.

The switch fabric 104 provides datapaths between input ports and output ports and may include, for example, shared memory, shared bus, and crosspoint matrices. Although not depicted, the network node 100 may be equipped with redundant switch fabrics. The control module and line cards may communicate with each other through the switch fabric and/or through a separate communications channel such as a backplane channel. Other embodiments of the network node may not include a switch fabric and having a switch fabric is not critical to the invention.

The control module 102 supports various functions including control protocol implementation functions. Exemplary functions that are performed by the control module includes implementing configuration commands, providing timing control, programming hardware tables, providing system information, supporting a user interface, managing hardware changes, bus management, managing logical ports, managing VLANs, and control protocol processing. Exemplary control protocols that are implemented by the control module include Layer 2 (L2) protocols, such as Spanning Tree Protocol (STP) (IEEE 802.1ID), Link Aggregation Control Protocol (LACP) (IEEE 802.3ad), Connectivity Fault Management (CFM) (IEEE802.1ag), Continuity Check Message (CCM) (IEEE 802.1ag), and Bidirectional Flow Detection (BFD) and Layer 3 (L3) protocols such as OSPF, RIP, and ISIS, where the layers are defined by the International Standards Organization (ISO) in the Open System Interconnect (OSI) model.

The control module 102 includes a processor 116 and memory 118 for carrying out the designated functions. The processor may include a multifunction microprocessor and/or an application specific processor that is operationally connected to the memory. The memory may include EEPROM or flash ROM for storing operational code and DRAM for buffering traffic and storing data structures, such as port information and VLAN tables. Although the processor and memory are depicted as separate functional units, in some instances, the processor and memory are integrated onto the same device. In addition, there may be more than one discrete processor unit and more than one memory unit on the control modules.

As described above, the control module 102 implements various different control protocols. Many of the control protocols make protocol decisions based on information that is received from other network nodes. In particular, control protocol information in the form of control protocol messages is received at the line cards 106A-106C of the network node 100. The line cards identify the received control protocol messages as control protocol messages and forward the control protocol messages to the control module. As used herein, control protocol messages and control protocol information refer to messages and information that are dedicated to implementing a control protocol. Control protocol messages and control protocol information does not include the typical payload data that is exchanged between host devices via a network. Rather, the control protocol messages and control protocol information carry information that is specific to ensuring that the network can effectively communicate data between host devices.

Figure 2:
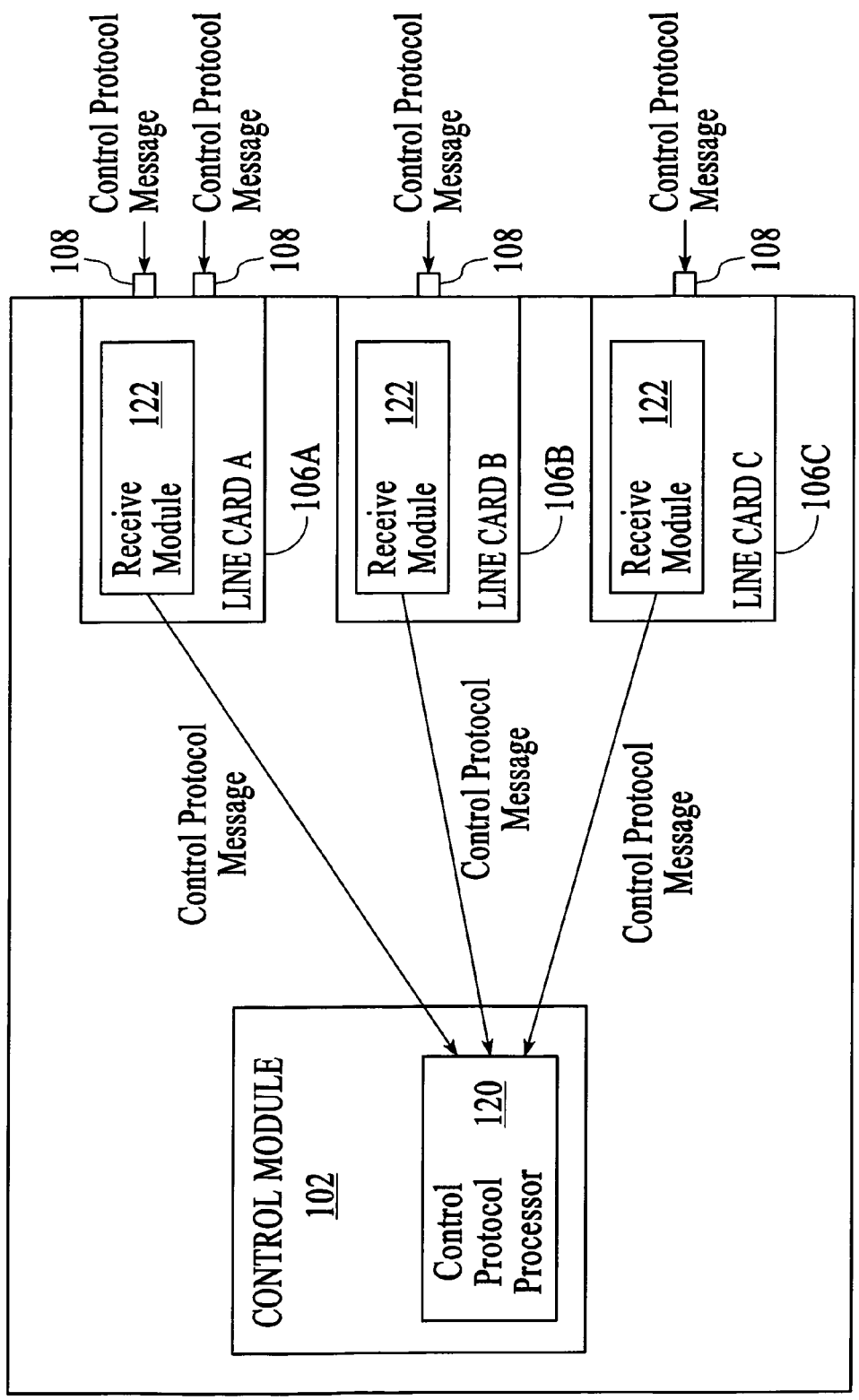
FIG. 2 illustrates the forwarding of control protocol messages from receive modules to a control protocol processor.

In an embodiment, the control module 102 of the network node includes a control protocol processor for implementing a control protocol and each line card 106A-106C includes a receive module for processing incoming frames, identifying control protocol messages, and managing the distribution of control protocol information between the receive modules and the control protocol processor. FIG. 2 illustrates the forwarding of control protocol messages from receive modules 122 to a control protocol processor 120. In the embodiment of FIG. 2, the control protocol processor and receive module are functional elements that are implemented through hardware, software, firmware, or any combination thereof. The processors 110 and 116 and memory 112 and 118 that are used to implement the control protocol processor and receive module are described above with reference to FIG. 1. In an alternative embodiment, a control protocol processor may be implemented at each line card in addition to or instead of the control protocol processor at the control module. In fact, the exact location of the control protocol processor is implementation specific and is in no way limited to the configuration of FIGS. 1 and 2.

Referring to FIG. 2, many of the control protocol messages received by the receive modules 122 for protocol processing are redundant messages (e.g., "hello" messages which typically do not carry updated protocol information after an initial period of protocols stabilization). That is, the control protocol messages that are generated during steady state operation of a protocol typically do not carry control protocol information that is going to change the control protocol state and therefore the processing of the redundant control protocol messages by the control protocol processor wastes valuable processing resources. In accordance with an embodiment of the invention, messages that are identified as control protocol messages are checked at the receive module to see if the messages carry any updated control protocol information. If a control protocol message carries updated control protocol information, then the message is forwarded from the receive module to the control protocol processor 120 and if the message does not carry any updated control protocol information then the message is dropped at the receive module. By dropping control protocol messages that do not carry any updated control protocol information, valuable resources are not wasted processing redundant control protocol information that will have no affect on the protocol state.

Figure 3:
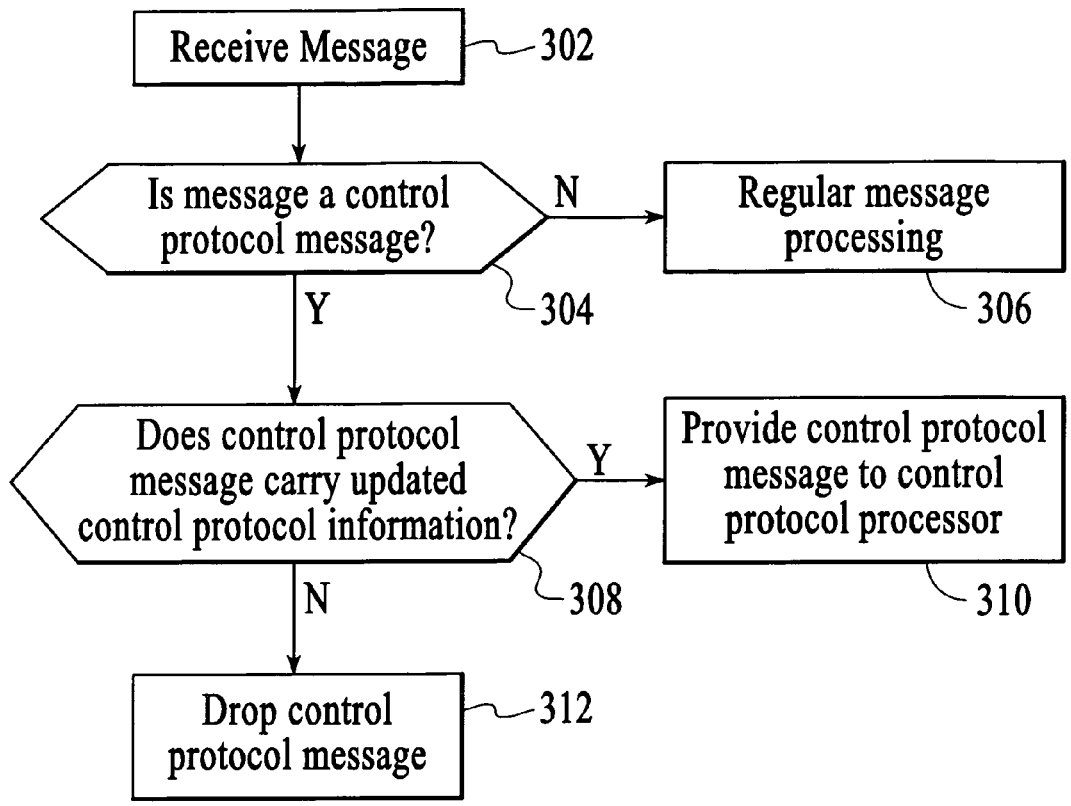
FIG. 3 depicts a process flow diagram of a method for managing control protocol information in a network node in accordance with an embodiment of the invention.

FIG. 3 depicts a process flow diagram of a method for managing control protocol information in a network node in accordance with an embodiment of the invention. At block 302, a message is received. At decision point 304, it is determined if the message is a control protocol message. If the message is not a control protocol message, then the message is subjected to regular message processing, block 306. If the message is a control protocol message, then the process proceeds to decision point 308, where it is determined whether or not the control protocol message carries updated control protocol information. If the control protocol message does not carry updated control protocol information, then the message is dropped, block 312. If the message does contain updated control protocol information, then the message is provided to the control protocol processor, block 310.

Because some of the control protocol messages are not being provided to the control protocol processor (e.g., the control protocol messages that do not carry updated control protocol information), the control protocol processor may not know if a peer network node is alive or not. In an embodiment, to accommodate the fact that some expected control protocol messages are not received by the control protocol processor, the receive module is configured to notify the control protocol processor if a certain criteria is met, for example, if a specified number of control protocol messages have not been received within a pre-established time interval. In an embodiment, an expiry notice is sent to the control protocol processor if control protocol messages are not received within a specified interval related to the protocol. For example, a pre-established maximum time interval may be established for the receipt of a control protocol message. The time interval is reset each time a control protocol message is received. If a control protocol message is not received within the pre-established time interval, then an expiry notice is sent to the control protocol processor indicating that an expected control protocol message or control protocol messages have not been received. If the pre-established interval expires, then the next control protocol message that is received is forwarded to the control protocol processor regardless of whether or not the message carries updated control protocol information.

To effectively implement the above-described method for managing control protocol information, it is key to be able to quickly and efficiently determine if a control protocol message carries updated control protocol information. In accordance with an embodiment of the invention, the determination as to whether or not a control protocol message carries updated control protocol information is made by generating a digest from a control protocol message and comparing the digest to a digest generated from a previously received control protocol message. A mismatch between the newly generated digest and the digest from the previously received control protocol message is considered an indication that the current message carries updated control protocol information.

Figure 4:
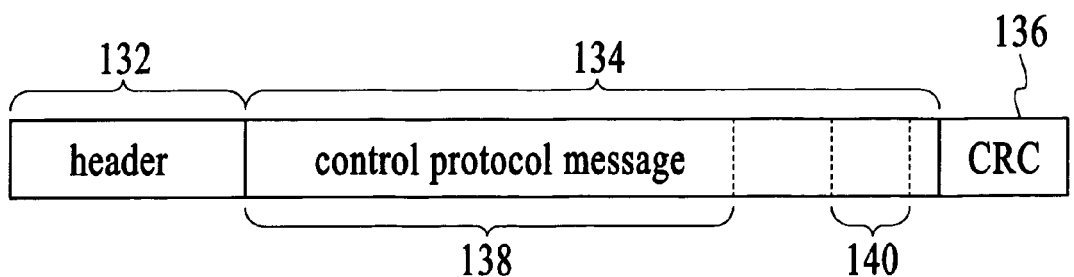
FIG. 4 depicts an exemplary information frame, such as an Ethernet frame, which carries a control protocol message.

Because the goal is to determine whether or not the control protocol message carries updated control protocol information, the digest can be generated from a subset of the entire control protocol message. In particular, the digest can be generated from a pre-determined field of the message that is expected to indicate that the control protocol information has been updated relative to a previously received control protocol message. FIG. 4 depicts an exemplary information frame 130, such as an Ethernet frame, which carries a control protocol message. The Ethernet frame includes a header 132, a payload 134, and a CRC 136 and the control protocol message is carried in the payload portion of the frame. A digest is generated from the control protocol message and may involve using the entire control protocol message or a subset of the control protocol message. A control protocol message can carry many different types of information depending on the control protocol. Some of the information in a control protocol message may carry information that is indicative of a protocol update while other information may not provide any indication of a protocol update or may provide a false indication of a protocol update. Many control protocol messages have a specified format in which certain fields are dedicated to carry specific information. Some specified fields are only expected to change if a protocol update is carried in the message and these changes will translate to a change in the digest. Examples of protocols and fields which will indicate a protocol update include Actor Key information in an LACP (IEEE802.3ad) frame, the Root Identifier in an STP (IEEE 802.1D) frame, or the Remote Defect Indication (RDI) bit in a CCM frame (IEEE 802.1ag).

Other specified fields in a control protocol message may not change even if updated control protocol information is carried in the message. For example, reserved fields that are typically set to zero by the transmitting node. Because such fields do not change even if updated control protocol information is carried in the message, a digest based solely on one of these fields is not sufficient to indicate the existence of updated control protocol information.

Still other specified fields may cause a change in the digest even though the message does not carry any updated protocol information. For example, the 'Sequence Number' field in a CCM frame (IEEE 802.1ag) or a control protocol message having a field that indicates the transmit time of the control protocol message. The 'Sequence Number' or transmit time will change upon each re-transmission of the control protocol message even if the rest of the information in the control protocol message remains the same. If a digest is generated using a field that includes the transmit time field, the digest may change between messages creating a mismatch between digests even though the control protocol message does not carry any information that will change the state of the control protocol. The mismatch in the digest comparison could cause the receive module to determine that the control protocol message carries updated control protocol information when the only difference between the control protocol messages is the Sequence Number or message transmission time.

Because of the differences in the type of information carried in a control protocol message, one or more fields of a control protocol message that are used to generate a digest can be selected specifically to include information that is indicative of a protocol update while excluding information that is not indicative of a protocol update and/or falsely indicates a protocol update. That is, the digest is generated from one or more fields in the control protocol message that are expected to indicate updated control protocol information. Note that the fields used for digest generation can be a continuous string of data in a message or discontinuous strings of data in the message. FIG. 4 depicts two portions 138 and 140 of the control protocol message, which together are used to generate the digest.

As used herein, the term "digest" refers to any digital fingerprint that is generated from a data set such as a control protocol message or control protocol information. A digest may alternatively be referred to as a "hash" or "hash value." In an embodiment, the digest function or "hash function" that is used to generate the digest is optimized to identify differences in the selected field of the control protocol messages.

Figure 5:
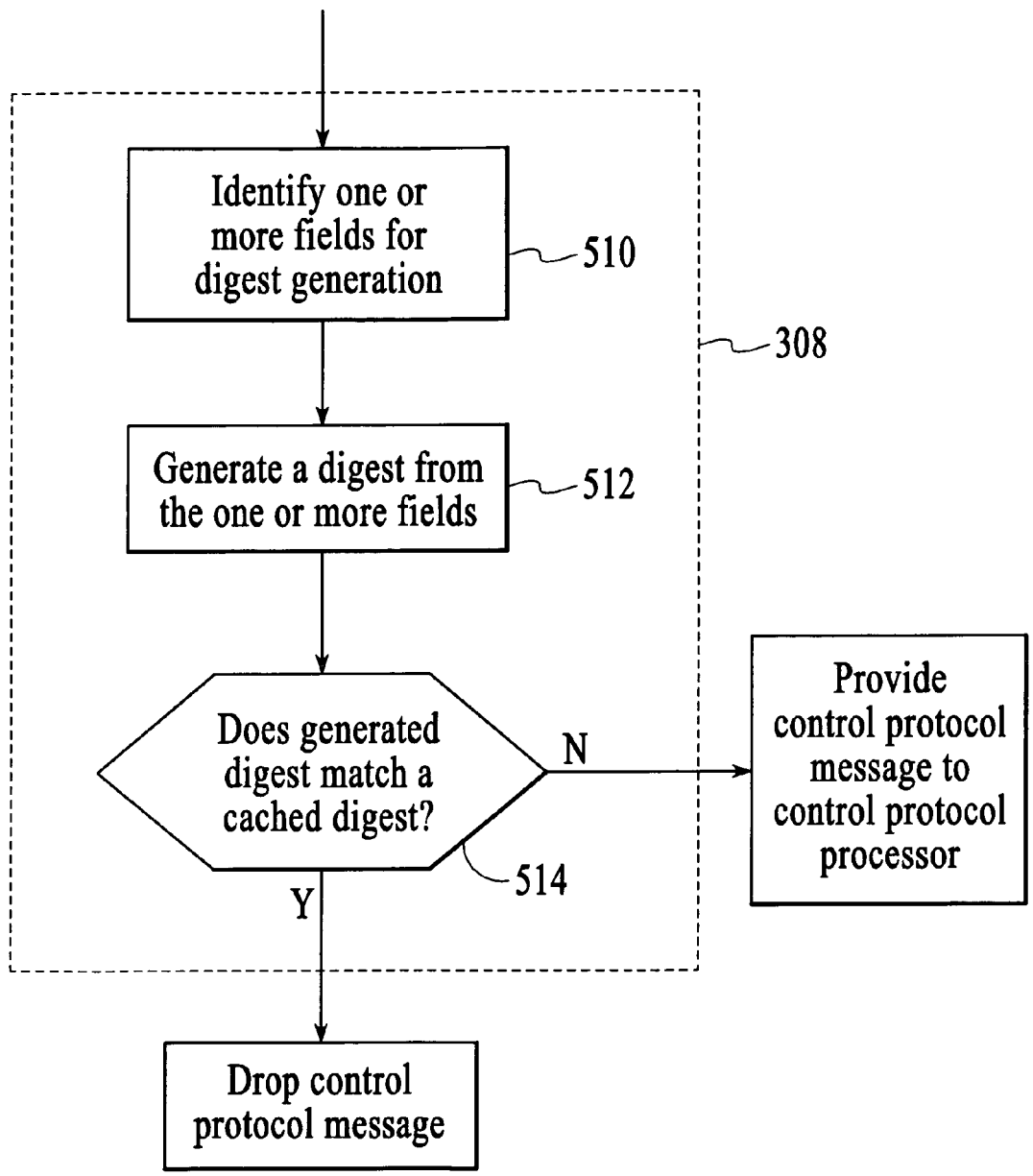
FIG. 5 is a process flow diagram of a digest-based method for determining whether or not a control protocol message carries updated control protocol information.

As stated above, one embodiment of the invention involves using a digest comparison process to identify whether or not a control protocol message carries updated control protocol information. FIG. 5 is a process flow diagram of a digest-based method for determining whether or not a control protocol message carries updated control protocol information. The method can be utilized to implement the logic of decision point 308 from FIG. 3. Referring to FIG. 5 at block 510, one or more fields from a control protocol message, which are to be used for digest generation, are identified. At block 512, a digest is generated from the one or more identified fields. At decision point 514, it is determined whether the generated digest matches a cached digest. If the digest matches a valid cached digest, then the control protocol message is dropped (i.e., it is not provided to the control protocol processor). If on the other hand, the digest does not match a cached digest, then the control protocol message is provided to the control protocol processor. As is described below, a cached digest may be uninstalled, for example, because a pre-established time interval has expired or because a corresponding protocol entity is removed.

Figures 6, 7:
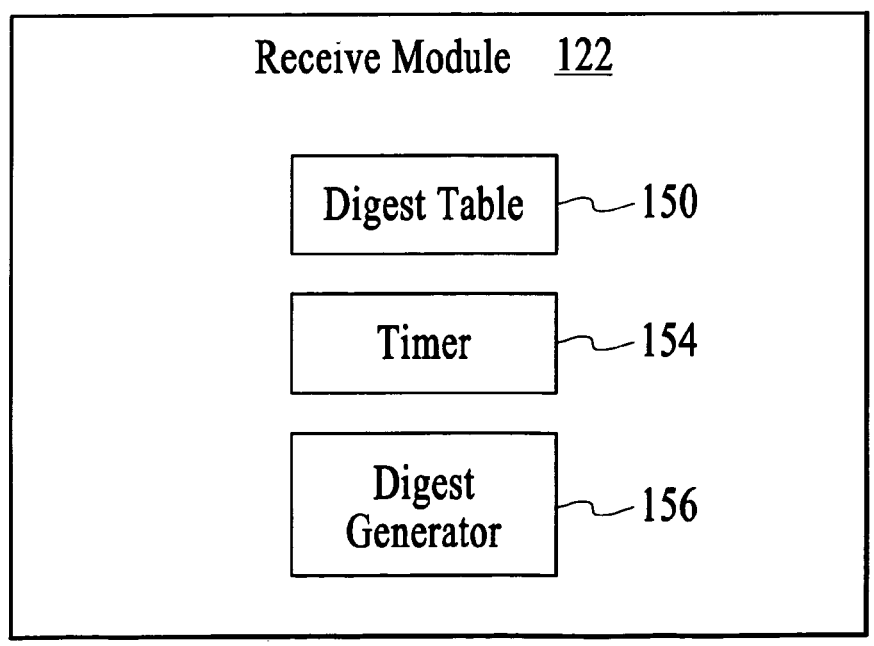
FIG. 6 depicts an embodiment of a digest table that is maintained by a receive module to determine whether or not a control protocol message carries updated control protocol information.
FIG. 7 depicts an embodiment of the receive module from FIG. 2 that includes a digest table, a timer, and a digest generator.

In an embodiment of the invention, the receive modules 122 maintain a digest table to support the checking of control protocol messages for updated control protocol information. FIG. 6 depicts an embodiment of a digest table 150 that is maintained by a receive module to determine whether or not a control protocol message carries updated control protocol information. The digest table includes a protocol entity identifier column, a protocol column, and a digest column, such that digest values can be maintained on a per-protocol basis for each protocol entity. In the digest table of FIG. 6, the protocol entity identifier column identifies the entity (e.g., a port, a VLAN, an interface, a service identifier, a virtual circuit, an MPLS pseudowire, or any combination thereof) on which a control protocol message is received, the protocol column identifies the protocol to which the control protocol message belongs, and the digest column identifies the digest that is generated from the specified field of the control protocol message. In an embodiment, when a protocol is configured to run on a port, the protocol entity identifier would be the port.

In operation, a table entry 152 can be made for each protocol and each protocol entity for which a control protocol message is received. When a first control protocol message is received for a particular protocol entity, a digest is generated from the message and a new table entry is added to the digest table 150. The table entry includes the protocol entity identifier, the protocol, and a digest. Initially, there are no table entries installed in the digest table. As new control protocol messages are received, the control protocol processor may send a signal to install corresponding entries in the digest table. While the table entry is installed, matches between a newly generated digest and a cached digest will result in a control protocol message being dropped. In an embodiment, the validity of a table entry is limited to a pre-established time interval. Once the time interval expires and no control messages are received within the specified interval, the table entry is uninstalled and subsequent control protocol messages related to the protocol entity are provided to the control protocol processor. For example, if a newly generated digest fails to match the corresponding digest in the digest table, then the corresponding control protocol message is provided to the control protocol processor and the table entry is uninstalled. A new table entry is not installed until a new digest value is generated. The new digest value will be the digest value from the most recently received control protocol message. In an embodiment, the digest table is implemented in RAM, however, other implementations are possible.

FIG. 7 depicts an embodiment of the receive module 122 from FIG. 2 that includes a digest table 150, a timer 154, and a digest generator 156. The digest table stores digest information, for example, the information described with reference to FIG. 6. The timer includes timing control functionality that enables a pre-established time limit to be associated with each entry in the digest table and the digest generator generates the digests that are used to determine if control protocol messages should be provided to the control protocol processor. The above-described functional elements of a receive module can be implemented in hardware, software, firmware, or any combination thereof. In an embodiment, the functional elements of the receive module are implemented via the processor and memory of the line cards as described above with reference to FIG. 1.

Figure 8:
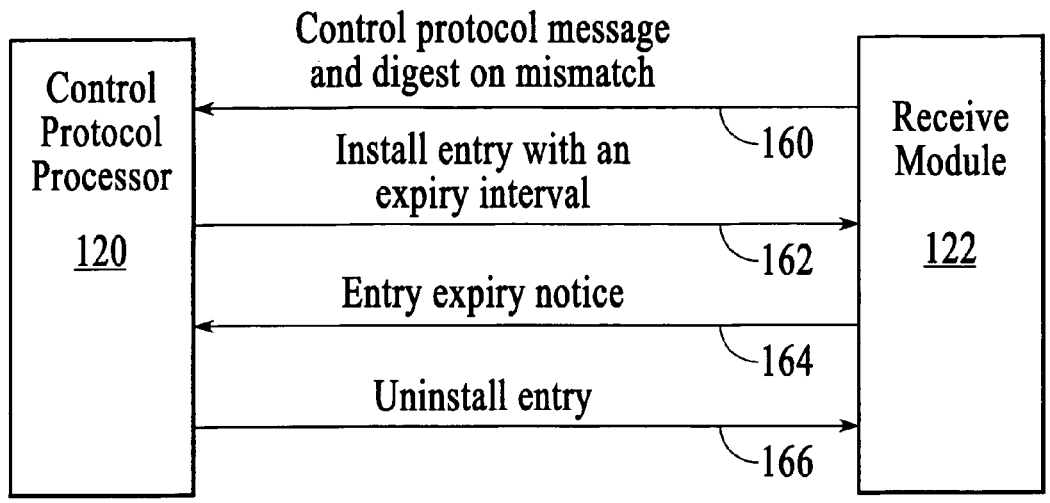
FIG. 8 depicts exemplary communications that take place between a control protocol processor and a receive module to implement a digest-based technique for managing control protocol information.

FIG. 8 depicts exemplary communications that take place between a control protocol processor and a receive module to implement the above-identified digest-based technique for managing control protocol information. Referring to FIG. 8, a control protocol message and a digest of the control protocol message are provided to the control protocol processor (communication 160) in response to receiving a control protocol message that does not match an entry in the digest table. Subsequent messages and digests that are received at the receive module are also provided to the control protocol processor until a corresponding entry is installed in the digest table. At some point, for example, once the control protocol has reached a steady state, the control protocol directs the receive module to install an entry into the digest table (communication 162). The digest may also have an associated time interval (expiry interval), which is the maximum time interval between which control protocol messages are expected to be received. Once the table entry is installed, received control protocol messages are processed as described above with reference to FIGS. 3 and 5.

In the event that a table entry expires, the table entry is uninstalled and the receive module sends a digest expiry notice to the control protocol processor (communication 164). In response to the digest expiry notice, the control protocol processor may, for example, trigger logic within the control protocol processor to indicate a peer timeout. In the event that the protocol is disabled or the control protocol processor determines that the control protocol is disabled, the control protocol processor instructs the receive module to uninstall the table entry with an explicit notice (communication 166).

The communications depicted in FIG. 8 can occur at different times and should not be limited to the depicted order. Further, although some exemplary communications are described with reference to the control protocol processor and a receive module, other communications between the control protocol processor and the receive module are possible.

Some control protocols are configured to receive control protocol messages at specified intervals regardless of whether or not the messages include any updated control protocol information. In accordance with an embodiment of the invention, a control protocol processor may need to be modified to deal with the fact that the control protocol processor may not receive a control protocol message within the expected interval. In an embodiment, a control protocol processor is configured to not timeout from protocol processing if a control protocol message is not received within an expected time interval. Rather, the control protocol processor is configured to trigger an appropriate timeout operation in response to receiving an expiry notice from the receive module.

Figure 9:
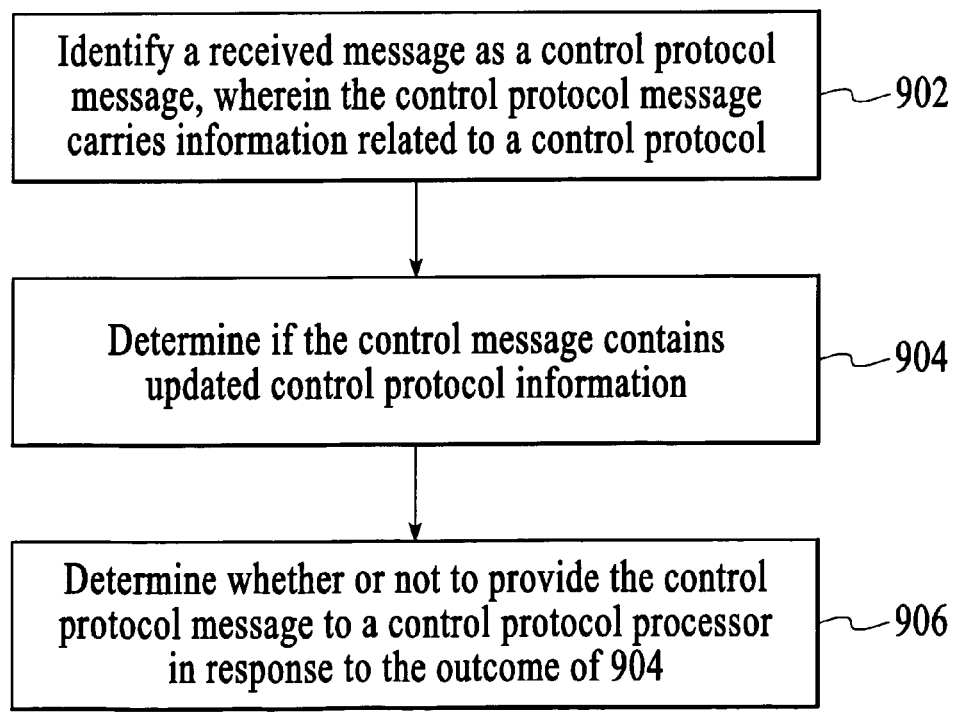
FIG. 9 is a process flow diagram of method for managing control protocol information in accordance with an embodiment of the invention.

FIG. 9 is a process flow diagram of method for managing control protocol information in accordance with an embodiment of the invention. At block 902, a received message is identified as a control protocol message, wherein the control protocol message carries information related to a control protocol. At block 904, it is determined if the control message contains updated control protocol information. At block 906, it is determined whether or not to provide the control protocol message to a control protocol processor in response to the outcome of block 904.

Figure 10:
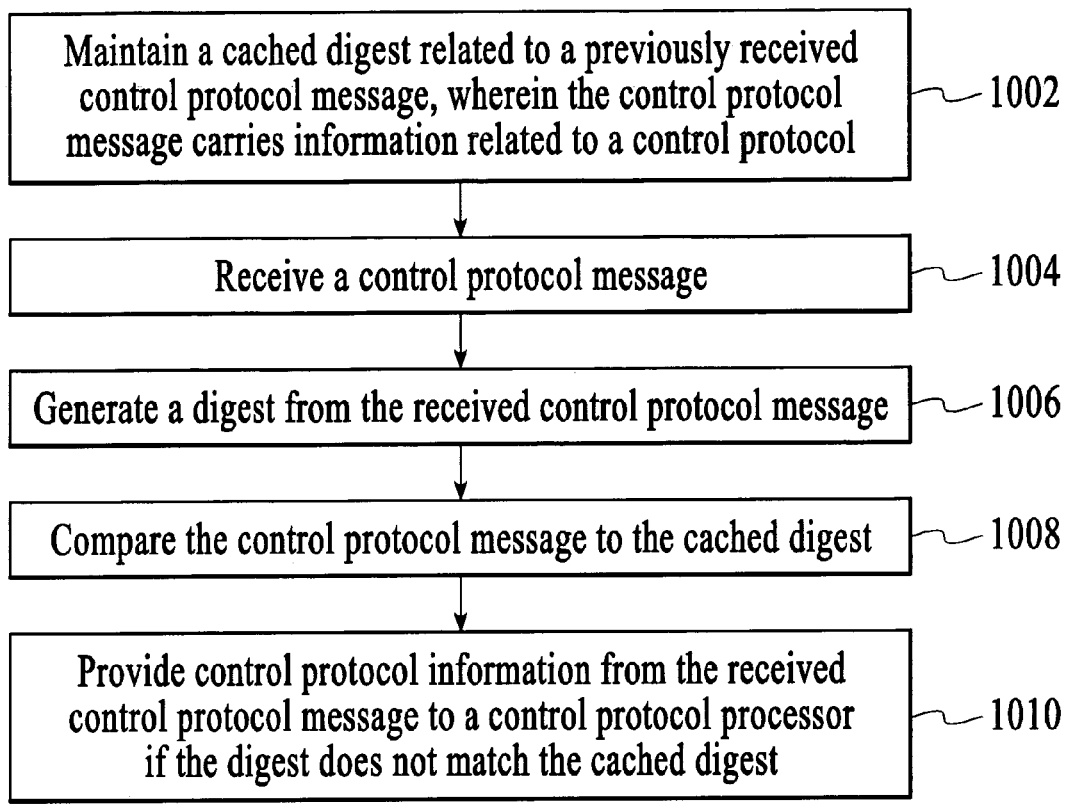
FIG. 10 is a process flow diagram of another method for managing control protocol information in accordance with an embodiment of the invention.

FIG. 10 is a process flow diagram of another method for managing control protocol information in accordance with an embodiment of the invention. At block 1002, a cached digest related to a previously received control protocol message is maintained, wherein the control protocol message carries information related to a control protocol. At block 1004, a control protocol message is received. At block 1006, a digest is generated from the received control protocol message. At block 1008, the control protocol message is compared to the cached digest. At block 1010, control protocol information from the received control protocol message is provided to a control protocol processor if the digest does not match the cached digest.

In addition to receiving and processing control protocol messages, the control protocol processor may generate control protocol messages that are to be sent from the line cards to other network nodes. As a result of protocol requirements (e.g., retransmission requirements), many of the transmitted control protocol messages do not carry updated control protocol information that will change the protocol state and typically only serve the purpose of notifying another control protocol processor of the protocol entity's connectivity to a peer protocol entity. That is, many control protocol messages only serve the purpose of indicating connectivity to a peer protocol entity. In accordance with an embodiment of the invention, instead of having the control protocol processor repeatedly generating and sending redundant control protocol messages to the transmit modules, the control protocol messages are only sent to the transmit modules when there is updated control protocol information to communicate. Control protocol messages received at the transmit modules are cached at the transmit modules and used to regenerate control protocol messages that are required to be retransmitted at specified intervals or in response to certain triggers. A cached control protocol message is maintained at the transmit module and used to generate control protocol messages until a new control protocol message, which carries updated control protocol information, is provided to the transmit module. By caching a control protocol message at a transmit module and using the cached control protocol message to generate subsequent redundant control protocol messages, processing resources of the control protocol processor are conserved and can be used for other operations.

Figure 11:
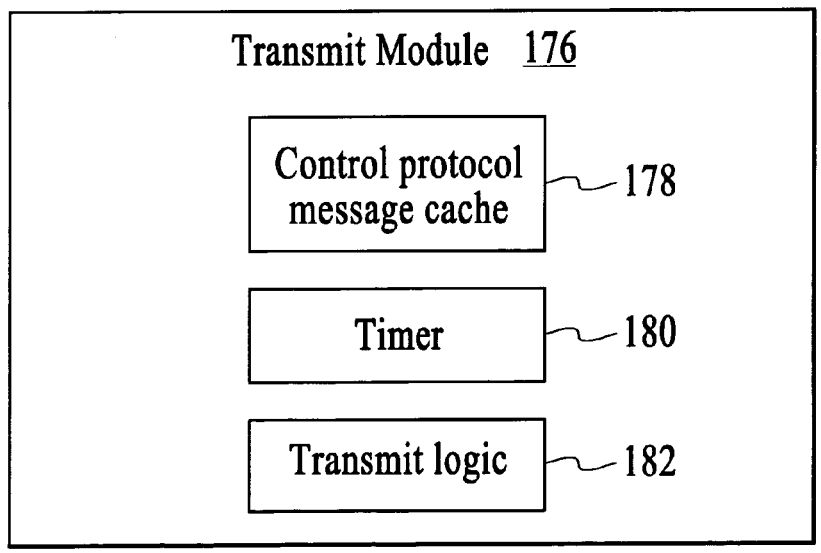
FIG. 11 depicts an embodiment of a transmit module that includes a control protocol message cache, a timer, and transmit logic.

FIG. 11 depicts an embodiment of a transmit module 176 that resides at the line cards 106A-106C. The transmit module is a functional element that is implemented in hardware, software, firmware, or any combination thereof. The processor 110 and memory 112 that are used to implement the transmit modules at the line cards are depicted in FIG. 1. In the embodiment of FIG. 11, the transmit module includes a control protocol message cache 178, a timer 180, and transmit logic 182. The control protocol message cache holds control protocol messages that are provided from the control protocol processor and used to regenerate control protocol messages at specified regular intervals. The control protocol message cache can maintain control messages on a per protocol entity basis (e.g., a port, a VLAN, an interface, a service identifier, a virtual circuit, an MPLS pseudowire, or any combination thereof). The timer includes timing control functionality that enables control protocol modules to be transmitted at specified intervals and/or enables the control protocol messages to be used to generate subsequent control protocol messages for a limited time interval. The transmit logic controls the generation and transmission of control protocol messages.

Figure 12:
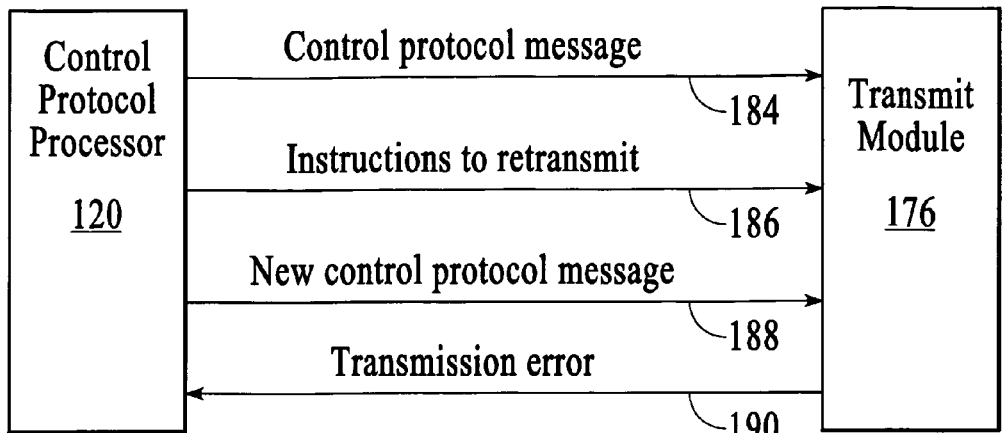
FIG. 12 depicts exemplary communications that take place between a control protocol processor and a transmit module to implement a transmission control technique.

FIG. 12 depicts exemplary communications that take place between the control protocol processor 120 and the transmit module 176 to implement the above-described transmission control technique. Referring to FIG. 12, a control protocol message, which is generated by the control protocol processor, is provided to the transmit module (communication 184). In addition to the control protocol message, the control protocol processor provides transmission instructions for the control protocol message to the transmit module (communication 186). In an embodiment, the transmission instructions identify an interval at which the control protocol messages are to be retransmitted and/or instructions to start or stop retransmissions. The transmit module generates control protocol messages from the cached control protocol message and retransmits the generated messages at the specified interval. The same cached control protocol message is used to generate subsequent control protocol messages until a new control protocol message is received from the control protocol processor (communication 188). Once a new control protocol message is received, the new control protocol message, which likely carries updated control protocol information is cached and used to generate subsequent messages. In the event that the transmit module is unable to retransmit a control protocol message based on its local cache, the transmit module notifies the control protocol processor (communication 190) so that the control protocol processor can take appropriate action.

The communications depicted in FIG. 12 can occur at different times and should not be limited to the depicted order.

Figure 13:
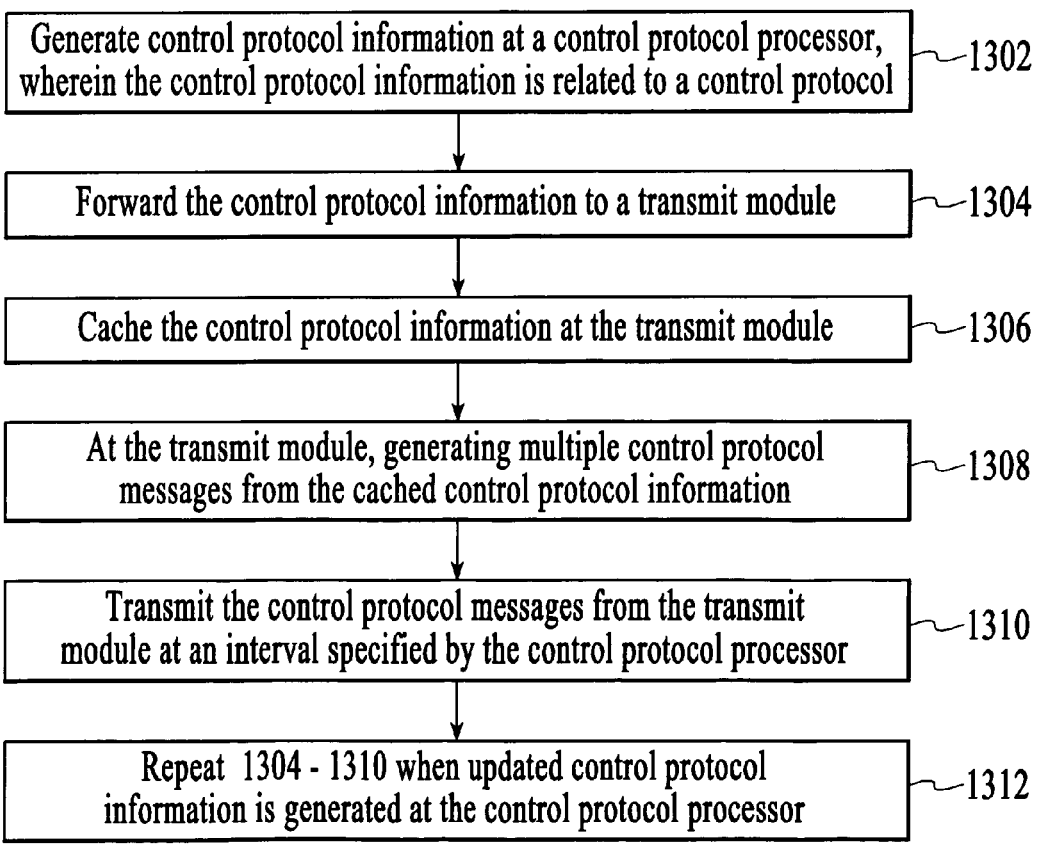
FIG. 13 is a process flow diagram of a method for managing control protocol information in a network node in accordance with an embodiment of the invention.

FIG. 13 is a process flow diagram of a method for managing control protocol information in a network node in accordance with an embodiment of the invention. At block 1302, control protocol information is generated at a control protocol processor, wherein the control protocol information is related to a control protocol. At block 1304, the control protocol information is forwarded to a transmit module. At block 1306, the control protocol information is cached at the transmit module. At block 1308, multiple control protocol messages are generated at the transmit module from the cached control protocol information. At block 1310, the control protocol messages are transmitted from the transmit module at an interval specified by the control protocol processor. At block 1312, block 1304-1310 are repeated when updated control protocol information is generated at the control protocol processor.

Although the control protocol processor 120 and receive modules 122 are described with reference to FIGS. 1 and 2 as being located in a separate control module 102 and lines cards 106A-106C, the control protocol processor and receive modules could be located on the same entity, such as on the same line card. For example, in an embodiment, protocol processing is done at the line card instead of at the control module or in addition to protocol processing at the control module. Further, the particular location of the control module relative to the receive module is implementation specific and depends on the architecture and resource allocation of the particular network node. Additionally, the control module and transmit modules 176 can be located on the same line card.

Although specific embodiments of the invention have been described and illustrated, the invention is not to be limited to the specific forms or arrangements of parts as described and illustrated herein. The invention is limited only by the claims.

What is claimed is:

1. A method for managing control protocol information in a network node, the method comprising:
   (a) receiving a message at the network node and identifying the received message as a control protocol message, wherein the control protocol message carries payload information related to a control protocol, in particular, payload information that is specific to ensuring that the network node can effectively communicate data between host devices, wherein the control protocol is one of Spanning Tree Protocol (STP) (IEEE 802.1D), Link Aggregation Control Protocol (LACP) (IEEE 802.3ad), Connectivity Fault Management (CFM) (IEEE802.1ag), Continuity Check Message (CCM) (IEEE 802.1ag), Bidirectional Flow Detection (BFD), Open Shortest Path First (OSPF), Routing Information Protocol (RIP), and Intermediate System to Intermediate System (ISIS) protocol;
   (b) determining if the control protocol message contains updated control protocol information, wherein the updated control protocol information is control protocol information that causes a change in state of a control protocol that is implemented by a control protocol processor of the network node;
   (c) determining whether or not to provide the control protocol message to the control protocol processor in response to the outcome of (b); and
   (d) providing the control protocol message to the control protocol processor of the network node for control protocol processing if the control protocol message contains updated control protocol information; and
   (e) dropping the control protocol message if the control protocol message does not contain updated control protocol information.

2. The method of claim 1 wherein determining if the control message contains updated control protocol information involves comparing information related to the control protocol message to information related to a previously received control protocol message.

3. The method of claim 1 wherein determining if the control message contains updated control protocol information involves generating a digest from the control message and comparing the digest to a digest generated from a previously received control protocol message.

4. The method of claim 3 further comprising caching the digest generated from previously received control protocol messages.

5. The method of claim 3 wherein the digest is generated from a subset of the entire control protocol message.

6. The method of claim 5 wherein the digest is generated from one or more fields in the control protocol message that are expected to indicate updated control protocol information.

7. The method of claim 3 further comprising maintaining the digest in a digest table.

8. The method of claim 7 wherein digests are maintained on a per protocol entity basis, wherein a protocol entity comprises at least one of a port, a virtual local area identifier (VLAN), an interface, a service identifier, a virtual circuit, and a multiprotocol label switching (MPLS) pseudowire.

9. The method of claim 1 further comprising providing an expiry notice to the control protocol processor when a control protocol message has not been received for a pre-established time interval.

10. A network node comprising:
    a control protocol processor that is configured to implement a control protocol;
    at least one receive module that is configured to;
    (a) receive a message and identify the received message as a control protocol message, wherein the control protocol message carries payload information related to the control protocol that is implemented by the control protocol processor, in particular, payload information that is specific to ensuring that the network node can effectively communicate data between host devices, wherein the control protocol is one of Spanning Tree Protocol (STP) (IEEE 802.1D), Link Aggregation Control Protocol (LACP) (IEEE 802.3ad), Connectivity Fault Management (CFM) (IEEE802.1ag), Continuity Check Message (CCM) (IEEE 802.1ag), Bidirectional Flow Detection (BFD), Open Shortest Path First (OSPF), Routing Information Protocol (RIP), and Intermediate System to Intermediate System (ISIS) protocol;
    (b) determine if the control protocol message contains updated control protocol information, wherein the updated control protocol information is control protocol information that causes a change in state of a control protocol that is implemented by the control protocol processor;
    (c) determine whether or not to provide the control protocol message to the control protocol processor in response to the outcome of (b);
    (d) provide the control protocol message to the control protocol processor of the network node for control protocol processing if the control protocol message contains updated control protocol information; and (e) drop the control protocol message if the control protocol message does not contain updated control protocol information.

11. The network node of claim 10 wherein the receive module is configured to generate a digest from the control message and to compare the digest to a digest generated from a previously received control protocol message.

12. The network node of claim 11 wherein the receive module further comprises a digest table for storing digests generated from previously received control protocol messages.

13. The network node of claim 11 wherein the digest is generated from a subset of the entire control protocol message.

14. The network node of claim 13 wherein the digest is generated from one or more fields in the control protocol message that is are expected to indicate updated control protocol information.

15. The network node of claim 11 further comprising a digest table for maintaining digests generated from previously received control protocol messages.

16. The network node of claim 15 wherein digest values are maintained on a per protocol entity basis, wherein a protocol entity comprises at least one of a port, a VLAN, an interface, a service identifier, a virtual circuit, and an MPLS pseudowire.

17. A method for managing control protocol information in a network node, the method comprising:
   at the network node, maintaining a cached digest related to a previously received control protocol message, wherein the control protocol message carries payload information related to a control protocol, in particular, payload information that is specific to ensuring that the network node can effectively communicate data between host devices, wherein the control protocol is one of Spanning Tree Protocol (STP) (IEEE 802.1D), Link Aggregation Control Protocol (LACP) (IEEE 802.3ad), Connectivity Fault Management (CFM) (IEEE802.1ag), Continuity Check Message (CCM) (IEEE 802.1ag), Bidirectional Flow Detection (BFD), Open Shortest Path First (OSPF), Routing Information Protocol (RIP), and Intermediate System to Intermediate System (ISIS) protocol;
   receiving a control protocol message at the network node;
   generating a digest from the received control protocol message;
   comparing the control protocol message to the cached digest;
   providing control protocol information from the received control protocol message to a control protocol processor of the network node if the digest does not match the cached digest, wherein the non-matching digest indicates that the control protocol information is control protocol information that causes a change in state of a control protocol that is implemented by the control protocol processor; and
   dropping the control protocol message if the control protocol message does not contain updated control protocol information.

18. The method of claim 17 wherein the digest is generated from a subset of the entire control protocol message and wherein the digest is generated from one or more fields in the control protocol message that are expected to indicate updated control protocol information.

* * * * *